United States Patent [19]
Devaure

[11] Patent Number: 4,513,402
[45] Date of Patent: Apr. 23, 1985

[54] EARTHQUAKE SIMULATOR

[75] Inventor: Bernard Devaure, Gradignan, France

[73] Assignee: Commissariat a l'Energie Atomique, Paris, France

[21] Appl. No.: 287,085

[22] Filed: Jul. 27, 1981

[30] Foreign Application Priority Data

Aug. 13, 1980 [FR] France .................. 80 17866

[51] Int. Cl.³ .......................... G01V 1/30; B06B 3/00
[52] U.S. Cl. ...................... 367/73; 181/116; 73/12
[58] Field of Search ............... 181/116, 117, 118, 119, 181/120, 278, 5; 73/12, 584, 594, 663, 665, 666; 102/530, 531, 305, 306, 307, 309, 310, 355, 701, 311; 367/73

[56] References Cited

U.S. PATENT DOCUMENTS

| 3,260,327 | 7/1966 | McCollum | 181/117 |
|---|---|---|---|
| 3,275,098 | 9/1966 | Filler | 181/116 |
| 3,368,642 | 2/1968 | Kilmer | 181/5 |
| 3,403,748 | 10/1968 | Tabor | 181/117 |
| 3,429,396 | 2/1969 | Jenner et al. | 181/117 |
| 3,555,878 | 1/1971 | Slutsky et al. | 73/12 |
| 3,577,762 | 5/1971 | Hornbogen et al. | 73/12 |
| 3,972,222 | 8/1976 | Yontiers et al. | 73/12 |
| 4,136,894 | 1/1979 | Ono et al. | 102/531 X |

FOREIGN PATENT DOCUMENTS

| 665545 | 6/1963 | Canada | 181/117 |
|---|---|---|---|
| 1437766 | 6/1976 | United Kingdom . | |
| 2026164 | 1/1980 | United Kingdom . | |

Primary Examiner—Maynard R. Wilbur
Assistant Examiner—Brian Steinberger
Attorney, Agent, or Firm—Pearne, Gordon, Sessions, McCoy, Granger & Tilberry

[57] ABSTRACT

Earthquake simulator making it possible to produce seismic waves and apply them to a sample, wherein it comprises a generator able to produce shock waves, whose frequencies are similar to the shock wave frequencies produced in a natural earthquake, the ratio of similitude being equal to $1/\lambda$ in which $\lambda$ is a positive integer, said generator being formed by a cylinder, sealed at one of its ends by one of the walls of a cell containing the sample and at the other end by a thick wall to which are fixed means making it possible to produce shock waves within the cylinder, said waves being transmitted from the interior of the cylinder to the interior of the cell by means of openings made in the wall of the latter causing movements of the sample similar to those encountered during natural earthquakes.

7 Claims, 4 Drawing Figures

EARTHQUAKE SIMULATOR

BACKGROUND OF THE INVENTION

The present invention relates to an earthquake simulator making it possible to produce shock waves, whose frequencies are similar, to within a ratio of $1/\lambda$, to the shock wave frequencies produced in a natural earthquake. It permits the application thereof to a sample in order more particularly to determine the behaviour during an earthquake of buildings such as apartment building, monuments, nuclear power stations, etc.

BRIEF SUMMARY OF THE INVENTION

The simulator according to the invention comprises a generator able to produce shock waves whose frequencies are similar to the frequencies of shock waves produced in a natural earthquake. This generator is in the form of a cylinder sealed at one of its ends by one of the walls of a cell containing a sample and at the other end by a thick wall to which is fixed means making it possible to produce shock waves within this cylinder. These waves are transmitted from the interior of the cylinder to the interior of the cell by means of openings made in the wall of the latter, causing movements of the sample similar to those encountered during natural earthquakes.

According to a preferred embodiment of the invention, the means which produce the shock waves are constituted by pyrotechnic devices.

According to another preferred embodiment of the invention, the simulator also comprises means making it possible to eliminate high frequency shock waves obtained by reflection within the cylinder. These means preferably comprise a mechanical device placed within the cylinder and in the vicinity of the wall of the cell having the said openings, the mechanical device serving as a low pass filter.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
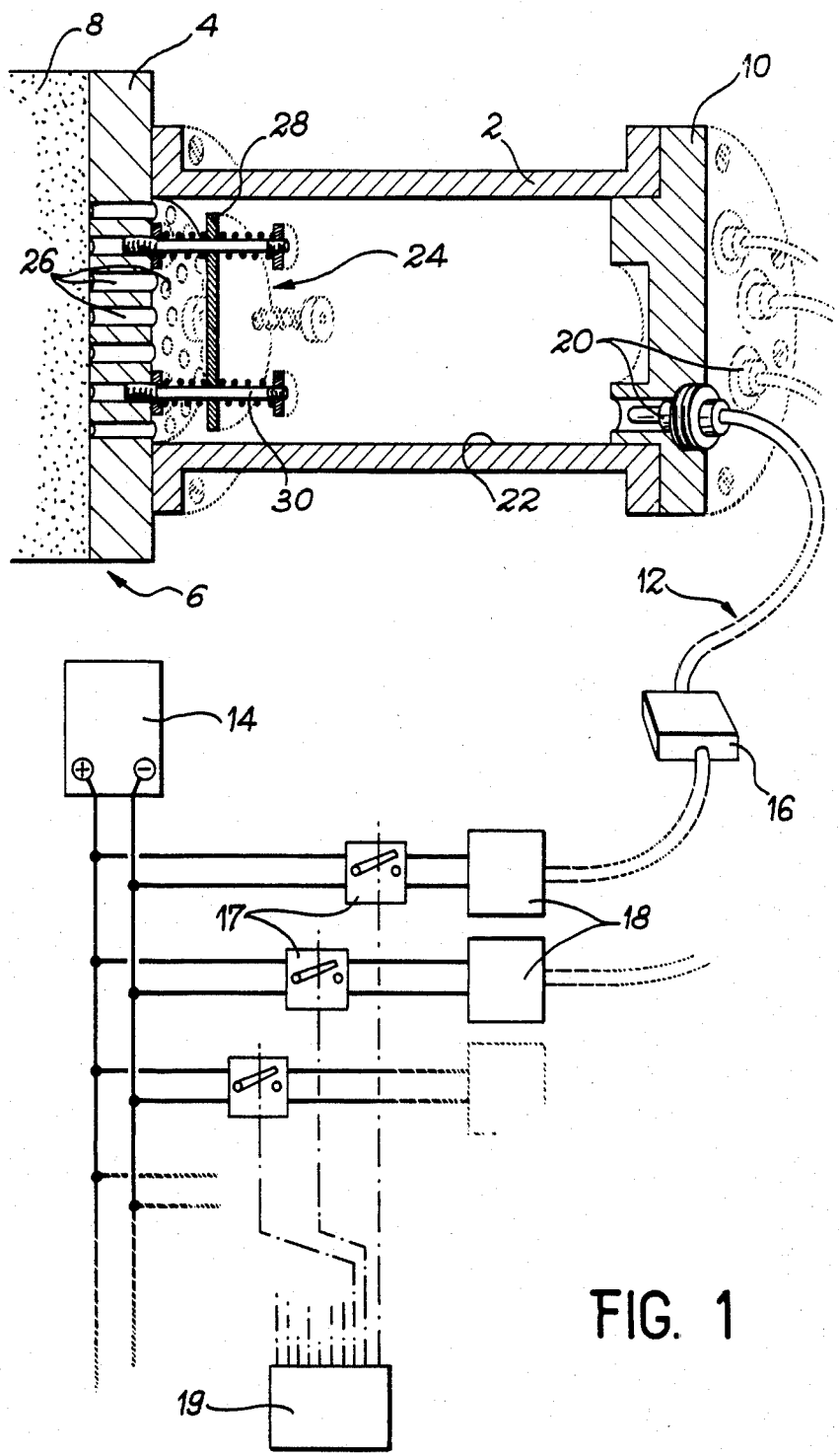
FIG. 1 diagrammatically, an earthquake simulator according to the invention.

The simulator according to FIG. 1 comprises a seismic wave generator formed by a cylinder 2, which is sealed at one of its ends by one of the walls 4 of a cell 6 containing a random sample 8 such as soil. At its other end, cylinder 2 is sealed by a thick wall 10 to which is fixed ten pyrotechnic devices 12. These pyrotechnic devices 12 are connected to a power supply 14 via two chassis, one of these 19 being a command transmitter and the other 18 a command receiver, a connector 16 and an explosive device 20 placed within the thick wall 10.

The firing of the pyrotechnic devices 12, which can be programmed by means of a programmer incorporated into the command transmitter chassis 19 causes, at the time of the explosion, shock waves which propagate in cylinder 2 and which are reflected on the inner walls 22 thereof. The firing of the different pyrotechnic devices 12 can either be carried out all at once, i.e. the simultaneous firing of the 10 devices, or each device can be fired separately and in succession. In the latter case, the time between each explosion is between 1 and 18 milliseconds. The firing of a particular pyrotechnique device is ensured by means of an electrical relay 17 connected to the programmer incorporated into the command transmitter chassis 19.

The waves transmitted by reflection to the inner walls 22 of cylinder 2 can have high frequencies, which can be eliminated by means of a mechanical device 24 serving as a low pass filter. Mechanical device 24 is placed within cylinder 2 in the vicinity of wall 4 of cell 6.

The shock waves, which are filtered or unfiltered as a function of the desired frequency range are transmitted from the interior of cylinder 2 to the interior of cell 6, whilst traversing wall 4 of the latter by means of openings 26. These shock waves are transmitted to soil 8 causing the latter to move in much the same way as would occur during natural earthquakes.

The simulation of the earthquake is brought about by placing a not shown model on the surface of the soil 8. It is in the form of a model of a any building at a scale reduced in the ratio $1/\lambda$. This model is held in place, either by positioning on soil 8 in a horizontal manner so that wall 4 is in contact with the soil and is placed below the latter, or by placing the whole arrangement in a pivoting macelle or pod located at the end of a centrifuge arm rotating under the action of an acceleration equal to $\lambda$ times the acceleration of gravity value (9.81 m/s$^2$). The reason is that the model has dimensions equal to $1/\lambda$ times those of the construction or building and the time scale in the simulator according to the invention is $1/\lambda$ times the real time scale. The factor $\lambda$ is preferably equal to 100.

Under the action of centrifugal force, the use of a centrifuge makes it possible to keep the model engaged with the soil 8 and the latter with the wall 4, when the latter is in the vertical position in the rest state or in the horizontal position under the effect of the centrifugal force.

Figure 2:
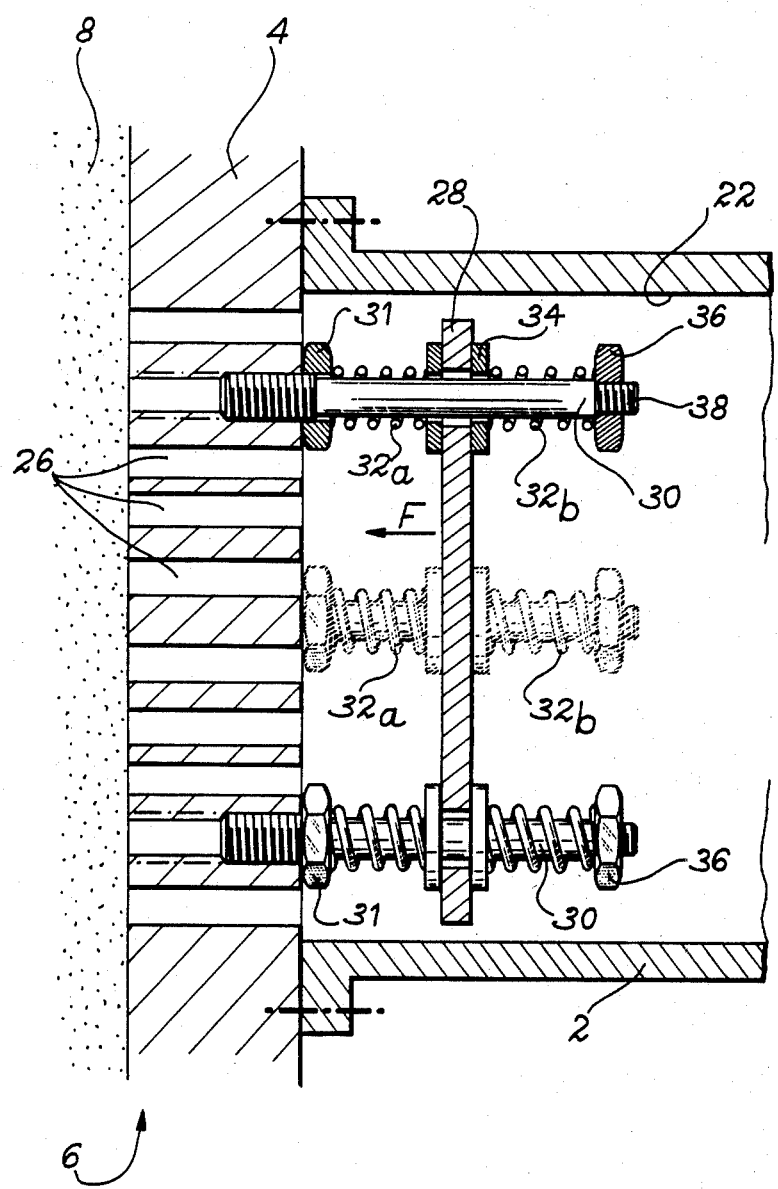
FIG. 2 diagrammatically, the mechanical filter of the device of FIG. 1.

FIG. 2 diagrammatically shows the mechanical filter 24 in greater detail. This mechanical filter comprises a plate secured by studs 30 screwed into wall 4 of cell 6 and held in place by lock nuts such as 31. As plate 28 is not in contact with the inner walls 22 of the cylinder, so as to permit the passage of shock waves from the cylinder to the cell in the manner described hereinbefore it may under the action of the shock waves move in the manner shown by arrow F. The displacement of plate 28 is regulated by helical springs 32 arranged around the studs 30.

Springs 32a, 32b positioned on the same stud and on either side of plate 28 produce opposing forces making it possible to return the plate to its initial position (position prior to displacement). Thus, when spring 32a contracts, spring 32b expands. Springs 32 can be engaged against plate 28 by means of washers such as 34 and are held on studs 30 by nuts 36 screwed onto the free end 38 of studs 30.

These springs 32 have a rigidity linked with the frequency which it is desired to obtain. Only high frequency shock waves, i.e. above 400 Hz reaching plate 28 are absorbed by the movement of the latter.

Obviously, any other form of mechanical device acting as a low pass filter can be envisaged without passing beyond the scope of the invention.

Figure 3:
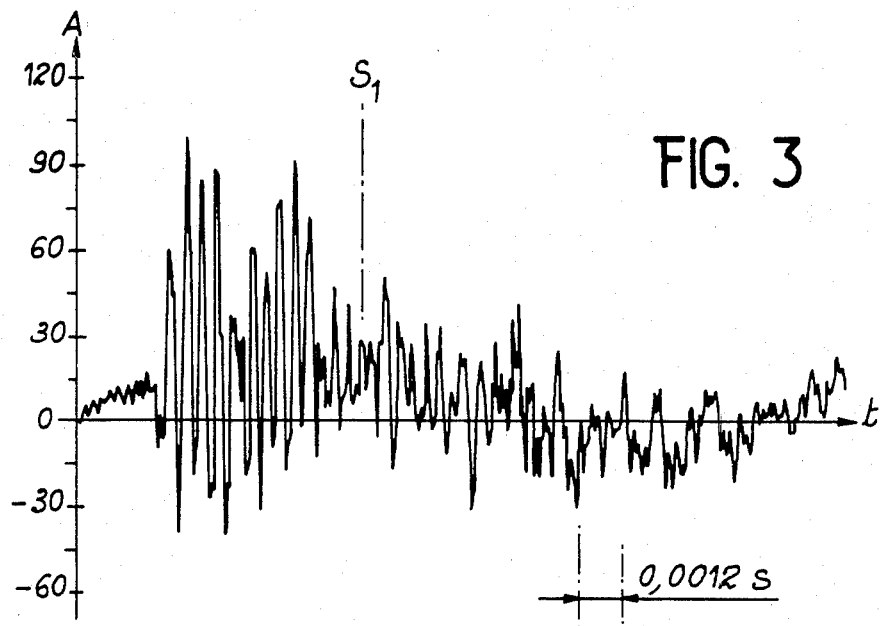
FIG. 3 the amplitude of the signal (A) supplied by the device without a mechanical filter and as a function of time (t).

The earthquake simulator used without the mechanical filter makes is possible to obtain shock waves, whose frequency spectrum has a maximum in the band around 1500 Hz and beyond. The signal obtained is shown in FIG. 3. Mark $S_1$ indicates the useful part of the unfiltered signal. The oscillations before mark $S_1$ are due to the explosion of the various pyrotechnic devices.

Figure 4:
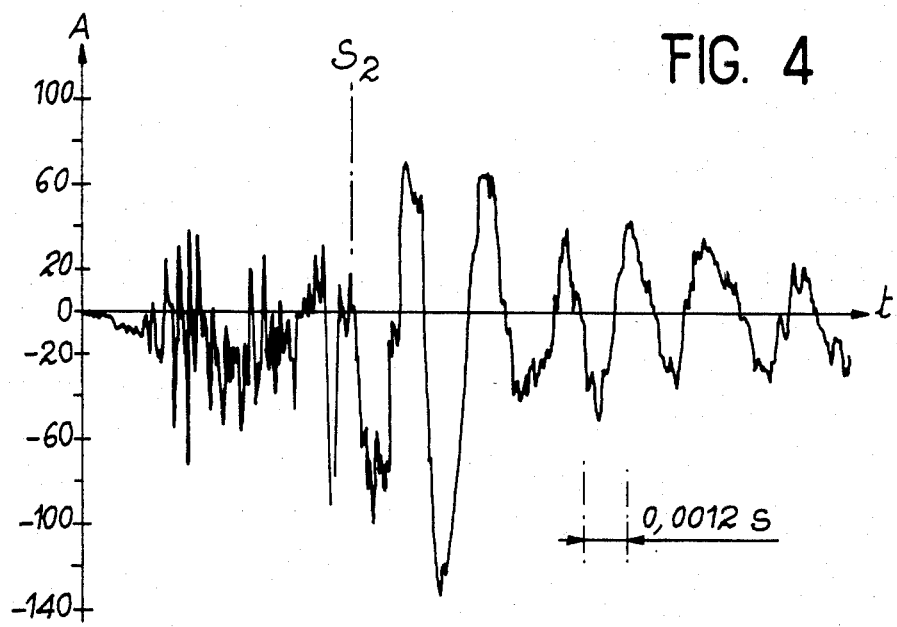
FIG. 4 the amplitude of signal (A) supplied by the device and provided with a mechanical filter as a function of time (t).

The earthquake simulator used with mechanical filter 24 makes it possible to obtain shock waves, whose frequency spectrum has a maximum in the 200-400 Hz band. The signal obtained is shown in FIG. 4. As hereinbefore, mark $S_2$ indicates the useful part of the filtered signal.

The use of a mechanical filter having a heavier plate compared with the filter supplying the signals shown in FIG. 4 and with more rigid springs makes it possible to obtain frequencies below 100 Hz, i.e. all shock waves with frequencies above 100 Hz can be eliminated.

Thus, this earthquake simulator makes it possible to produce shock waves, whose frequency spectra have maxima in frequency bands within the range 100 to 1500 Hz.

Bearing in mind the laws of similitude and the scale reduction coefficient $\lambda$ which is equal to 100, the frequency range becomes 1 to 15 Hz, which corresponds to most of the frequencies produced in natural earthquakes.

What is claimed is:

1. An earthquake simulator making it possible to produce seismic waves and apply them to a sample, wherein it comprises a generator able to produce shock waves, whose frequencies are similar to the shock wave frequencies produced in a natural earthquake, the ratio of similitude being equal to $1/\lambda$ in which $\lambda$ is a positive integer, said generator being formed by a cylinder, closed at one of its ends by one of the walls of a cell containing the sample and at the other end by a thick wall to which are fixed means making it possible to produce shock waves within the cylinder, said waves being transmitted from the interior of the cylinder to the interior of the cell by means of openings made in the walls, said waves causing movements of the sample similar to those encountered during natural earthquakes; a mechanical device functioning as a low pass filter and placed within the cylinder in the vicinity of the wall of the cell provided with the said openings, making it possible to eliminate the high frequency shock waves obtained by reflection within the cylinder, the mechanical device being constituted by studs screwed into the wall of the cell and by a plate located between two identical helical springs arranged round each of the studs, said plate havng no contact with the cylinder.

2. A simulator according to claim 1, wherein the springs are held on the studs by means of nuts screwed onto the free end of the said studs.

3. A simulator according to claims 1 or 2, wherein there are four studs.

4. A simulator according to claim 3, wherein there are 10 pyrotechnic devices.

5. A simulator according to claim 1, wherein the number $\lambda$ is equal to 100.

6. A simulator according to claim 1 wherein said structural model is a model of a building, monument, nuclear power station or the like.

7. A simulator according to claim 1, wherein the means producing the shock waves are constituted by pyrotechnic devices.

* * * * *